United States Patent
Yamamoto et al.

(10) Patent No.: US 11,630,542 B2
(45) Date of Patent: Apr. 18, 2023

(54) CAPACITIVE TOUCH PANEL AND DISPLAY DEVICE (71) Applicant: Sharp Display Technology Corporation, Kameyama (JP)

(72) Inventors: Takuma Yamamoto, Kameyama (JP); Takenori Maruyama, Kameyama (JP); Shinji Yamagishi, Kameyama (JP); Kazutoshi Kida, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/903,744

(22) Filed: Sep. 6, 2022

(65) Prior Publication Data

US 2023/0073370 A1 Mar. 9, 2023

(30) Foreign Application Priority Data

Sep. 9, 2021 (JP) .............................. JP2021-146941

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/041662* (2019.05); *G06F 2203/04103* (2013.01); *G06F 2203/04105* (2013.01); *G06F 2203/04107* (2013.01)

(58) Field of Classification Search
CPC .. G06F 3/0445; G06F 3/041; G06F 3/041662; G06F 2203/04103; G06F 2203/04105; G06F 2203/04107
See application file for complete search history.

(56) References Cited

U.S. PATENT DOCUMENTS

| 2015/0109231 A1* | 4/2015 | Shirai | G06F 3/0446 345/173 |
| 2016/0162076 A1* | 6/2016 | Fukagawa | G06F 3/0445 525/289 |
| 2016/0259482 A1* | 9/2016 | Ogikubo | G06F 3/0446 |
| 2017/0115780 A1* | 4/2017 | Ogikubo | G06F 3/0445 |

FOREIGN PATENT DOCUMENTS

WO 2016-009784 A1 1/2016

* cited by examiner

*Primary Examiner* — Temesghen Ghebretinsae
*Assistant Examiner* — Ivelisse Martinez Quiles
(74) *Attorney, Agent, or Firm* — ScienBiziP, P.C.

(57) ABSTRACT

A touch panel includes a transmission electrode layer that includes a transmission electrode to which a drive signal is supplied, a reception electrode layer that includes a position detection electrode and a pressing force detection electrode that form capacitance between the transmission electrode layer and themselves, in accordance with the capacitance, at least one of touching and pressing force is detected. The touch panel further includes a pressure-sensitive layer interposed between the transmission electrode layer and the reception electrode layer. The pressure-sensitive layer includes a first dielectric layer of which dielectric constant exhibits negative temperature properties in a predetermined temperature range, and a second dielectric layer of which dielectric constant exhibits positive temperature properties in the predetermined temperature range.

12 Claims, 12 Drawing Sheets

CAPACITIVE TOUCH PANEL AND DISPLAY DEVICE

BACKGROUND

1. Field

The present disclosure relates to a capacitive touch panel and a display device.

2. Description of the Related Art

There conventionally is known a capacitive touch panel having a dielectric film and a display device. Such a capacitive touch panel and a display device are disclosed in International Publication No. 2016/009784, for example.

The capacitive touch panel in the above International Publication No. 2016/009784 has a display, a lower adhesive layer, a capacitive touch panel sensor, an upper adhesive layer, and a protective substrate. The display, the lower adhesive layer, the capacitive touch panel sensor, the upper adhesive layer, and the protective substrate are layered in this order. The temperature dependency of a relative dielectric constant of the upper adhesive layer is no less than 1.5% and no more than 10.0%. Also, the temperature dependency of the relative dielectric constant of the lower adhesive layer is no less than the temperature dependency of the relative dielectric constant of the upper adhesive layer. Also, the difference in temperature dependency of the relative dielectric constant of the lower adhesive layer and temperature dependency of the relative dielectric constant of the upper adhesive layer is within 10.0%. Also, the relative dielectric constant of the upper adhesive layer and the relative dielectric constant of the lower adhesive layer both exhibit positive temperature properties.

Now, the capacitive touch panel in the above International Publication No. 2016/009784 detects touches in accordance with capacitance between a finger and the capacitive touch panel sensor. However, when the finger touches the protective substrate, heat from the finger is conducted to the protective substrate, and the heat is conducted to the upper adhesive layer via the protective substrate. In the capacitive touch panel described in the above International Publication No. 2016/009784, temperature dependency of the relative dielectric constant of the upper adhesive layer is set to no less than 1.5% and no more than 10.0%, and the relative dielectric constant of the upper adhesive layer exhibits positive temperature properties. Accordingly, in a case in which the temperature of the upper adhesive layer rises, the relative dielectric constant of the upper adhesive layer remains in a raised state even after the finger departs from the protective substrate, until the temperature of the upper adhesive layer returns to the temperature before rising. Accordingly, there is a problem in that the capacitive touch panel sensor erroneously detects change in capacitance due to heat (thermal noise) as touches, even in cases in which the finger is not touching the protective substrate.

Accordingly, the present disclosure provides a capacitive touch panel and a display device capable of suppressing erroneous detection of temperature change in the dielectric film as touches.

SUMMARY

According to a first aspect of the present disclosure, there is provided a capacitive touch panel including a transmission electrode layer that includes a transmission electrode to which a drive signal is supplied, a reception electrode layer that includes a plurality of reception electrodes that form capacitance between the transmission electrode layer and the reception electrodes, in accordance with the capacitance, at least one of touching and pressing force is detected, and a dielectric film interposed between the transmission electrode layer and the reception electrode layer. The dielectric film includes a first dielectric layer of which dielectric constant exhibits negative temperature properties in a predetermined temperature range, and a second dielectric layer of which dielectric constant exhibits positive temperature properties in the predetermined temperature range. Note that "dielectric constant exhibits positive temperature properties" means that the dielectric constant rises when the temperature rises in a predetermined temperature range, and "dielectric constant exhibits negative temperature properties" means that the dielectric constant drops when the temperature rises in a predetermined temperature range.

Also, according to a second aspect, there is provided a display device including the capacitive touch panel according to the first aspect, and a display that displays an image.

DESCRIPTION OF THE EMBODIMENTS

Embodiments of the present disclosure will be described in detail below, with reference to the drawings. Note that the present disclosure is not limited to the embodiments below, and design changes may be made as appropriate within a scope of satisfying the configuration of the present disclosure. Also, in the description below, portions in the drawings that have the same or equivalent functions are denoted with the same reference symbols among different drawings, and description thereof will not be repeated. Also, the configurations described in the embodiments and the modifications may be combined or change as appropriate without departing from the spirit of the present disclosure. Note that in the drawings referenced below, configurations may be illustrated in a simplified or schematized manner, and some components may be omitted, to facilitate description. Also, the dimensional ratios among components illustrated in the drawings may not necessarily be to actual scale.

First Embodiment

Configuration of Display Device

Figure 1:
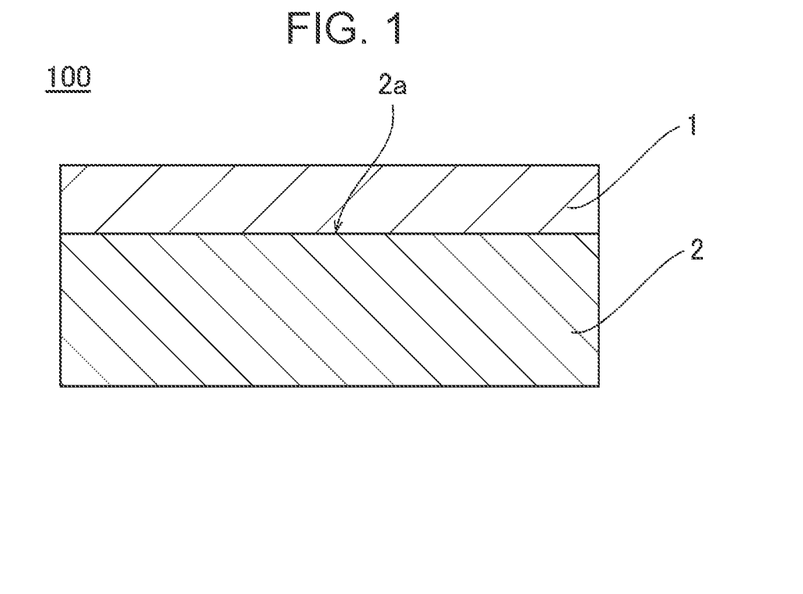
FIG. 1 is a sectional view illustrating a schematic configuration of a display device according to a first embodiment.

FIG. 1 is a sectional view illustrating a schematic configuration of a display device 100 according to a first embodiment. The display device 100 includes a touch panel 1, and a display unit 2 that displays images on a display face 2a. The display unit 2 is made up of, for example, a liquid crystal display or an organic electroluminescence (EL) display.

Configuration of Touch Panel

Figure 2:
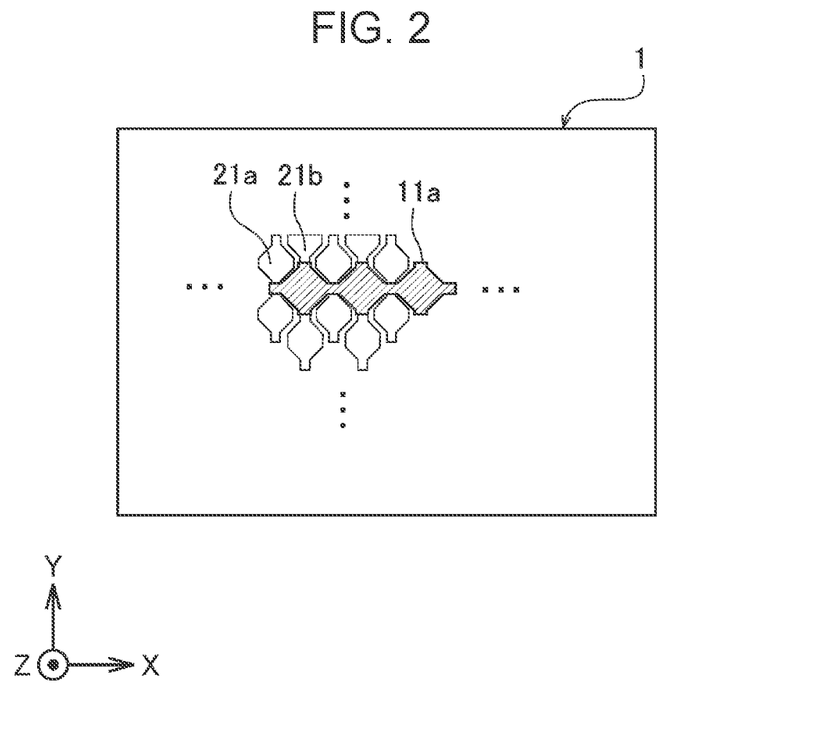
FIG. 2 is a plan view schematically illustrating a configuration of a touch panel according to the first embodiment.

FIG. 2 is a plan view schematically illustrating the configuration of the touch panel 1 according to the first embodiment. The touch panel 1 according to the first embodiment detects a position touched by an instructing member and pressing force by the instructing member. The touch panel 1 includes a plurality of transmission electrodes 11a, a plurality of position detection electrodes 21a, and a plurality of pressing force detection electrodes 21b. The touch panel 1 is a mutual capacitance type touch panel that detects change in capacitance between the plurality of transmission electrodes 11a and the plurality of position detection electrodes 21a or the plurality of pressing force detection electrodes 21b.

Figure 3:
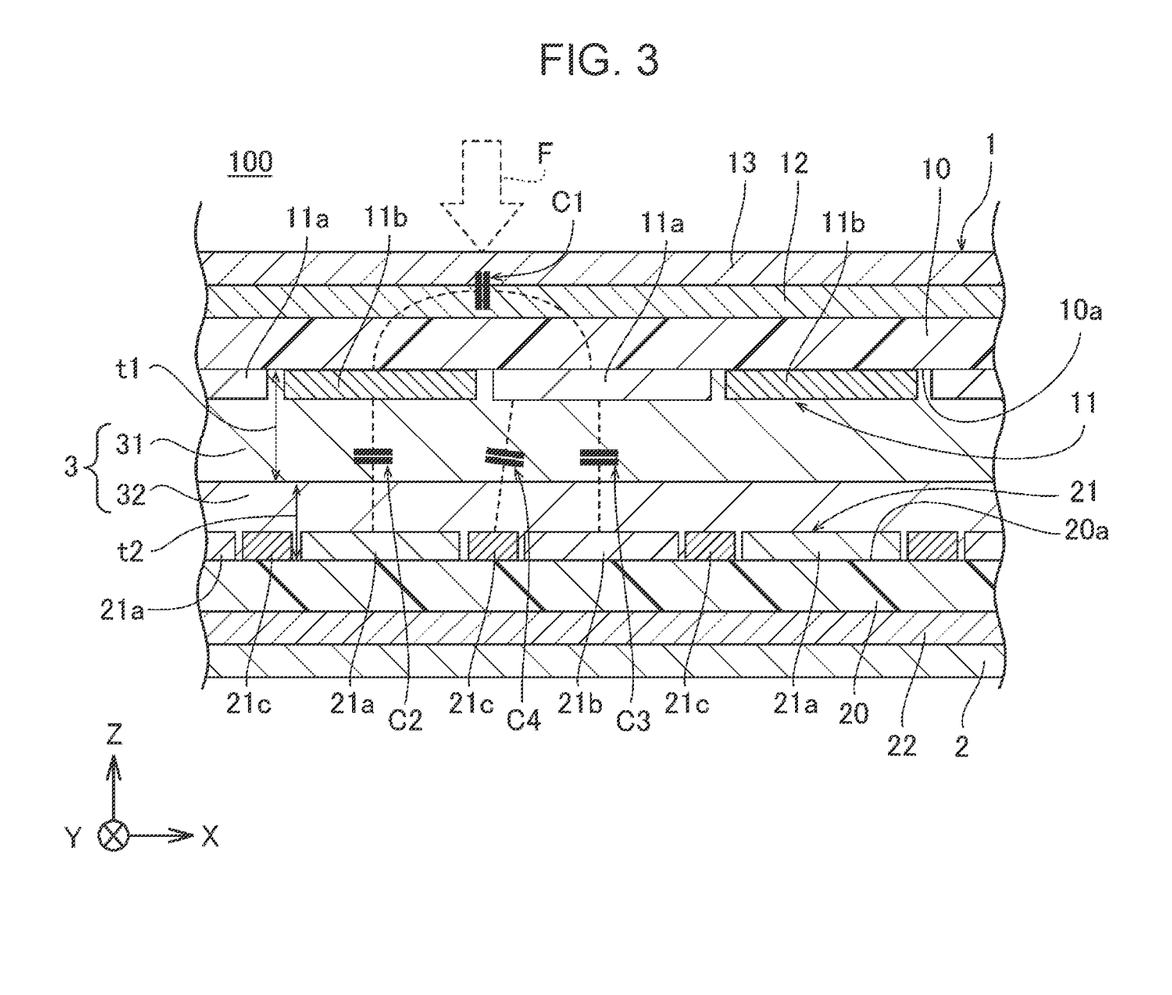
FIG. 3 is a sectional view of the touch panel according to the first embodiment.

FIG. 3 is a sectional view of the touch panel 1 according to the first embodiment. As illustrated in FIG. 3, the touch panel 1 includes a first substrate 10, a pressure-sensitive layer 3, and a second substrate 20. The first substrate 10, the pressure-sensitive layer 3, and the second substrate 20 are stacked. For example, the first substrate 10 and the second substrate 20 are made of a transparent resin material such as polyethylene terephthalate (PET) or the like. Also, the pressure-sensitive layer 3 is a dielectric film that contains a dielectric. Further, the pressure-sensitive layer 3 is made of a transparent pressure-sensitive material that has elasticity, such as a polymer material or the like. Also, an optical clear adhesive (OCA) layer 12 and a cover glass 13 are disposed on an opposite side of the first substrate 10 from the pressure-sensitive layer 3. The surface of the cover glass 13 is touched and pressed by the instructing member. The OCA layer 12 adheres the cover glass 13 and the first substrate 10. Also, an OCA layer 22 and the display unit 2 are disposed on the opposite side of the second substrate 20 from the pressure-sensitive layer 3.

As illustrated in FIG. 3, the touch panel 1 includes a transmission electrode layer 11 and a reception electrode layer 21. The transmission electrode layer 11 is formed upon a surface 10a of the first substrate 10 that is on the pressure-sensitive layer 3 side thereof. The reception electrode layer 21 is formed upon a surface 20a of the second substrate 20 that is on the pressure-sensitive layer 3 side thereof. The transmission electrode layer 11 includes transmission electrodes 11a and floating electrodes 11b. The reception electrode layer 21 includes the position detection electrodes 21a, the pressing force detection electrodes 21b, and shield electrodes 21c. Also, the transmission electrodes 11a, the floating electrodes 11b, the position detection electrodes 21a, the pressing force detection electrodes 21b, and the shield electrodes 21c are made of a transparent material that has electroconductivity, such as indium tin oxide (ITO) or the like. Drive signals, from a drive circuit that is omitted from illustration, are supplied to the transmission electrodes 11a. Potential of the floating electrodes 11b may be in a floating state. The floating electrodes 11b also form a capacitance C1 between themselves and the transmission electrodes 11a. The position detection electrodes 21a are electrodes for detecting the position of the instructing member along with the transmission electrodes 11a. The position detection electrodes 21a form a capacitance C2 between themselves and the floating electrodes 11b. The pressing force detection electrodes 21b are electrodes for detecting presence or absence of pressing force by the instructing member, and the magnitude of the pressing force. The pressing force detection electrodes 21b form a capacitance C3 between themselves and the transmission electrodes 11a. The shield electrodes 21c may have ground potential of the touch panel 1. The shield electrodes 21c form a capacitance C4 between themselves and the transmission electrodes 11a.

Figure 4:
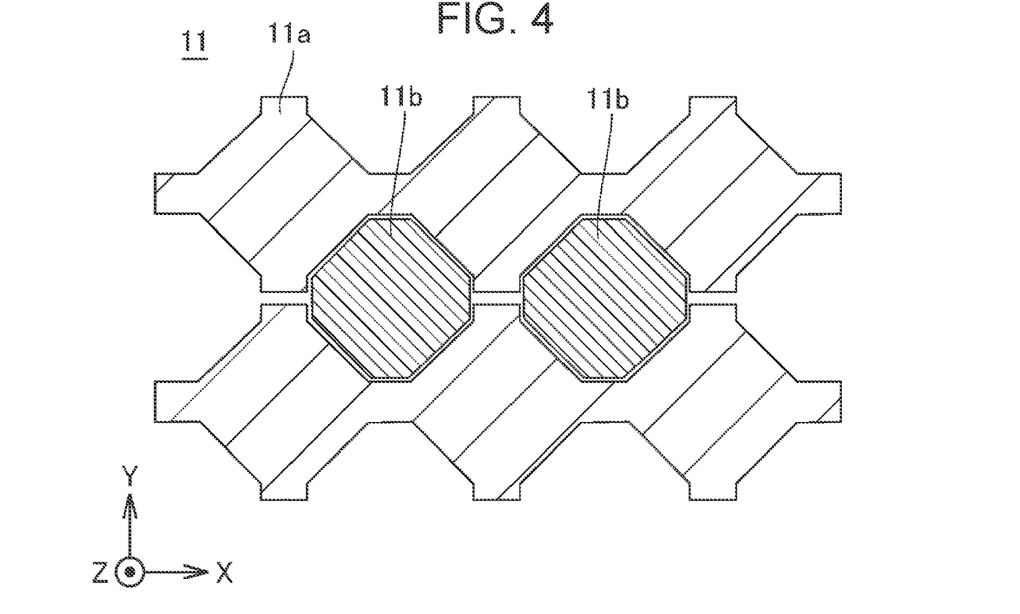
FIG. 4 is a plan view of part of a transmission electrode layer.
Figure 5:
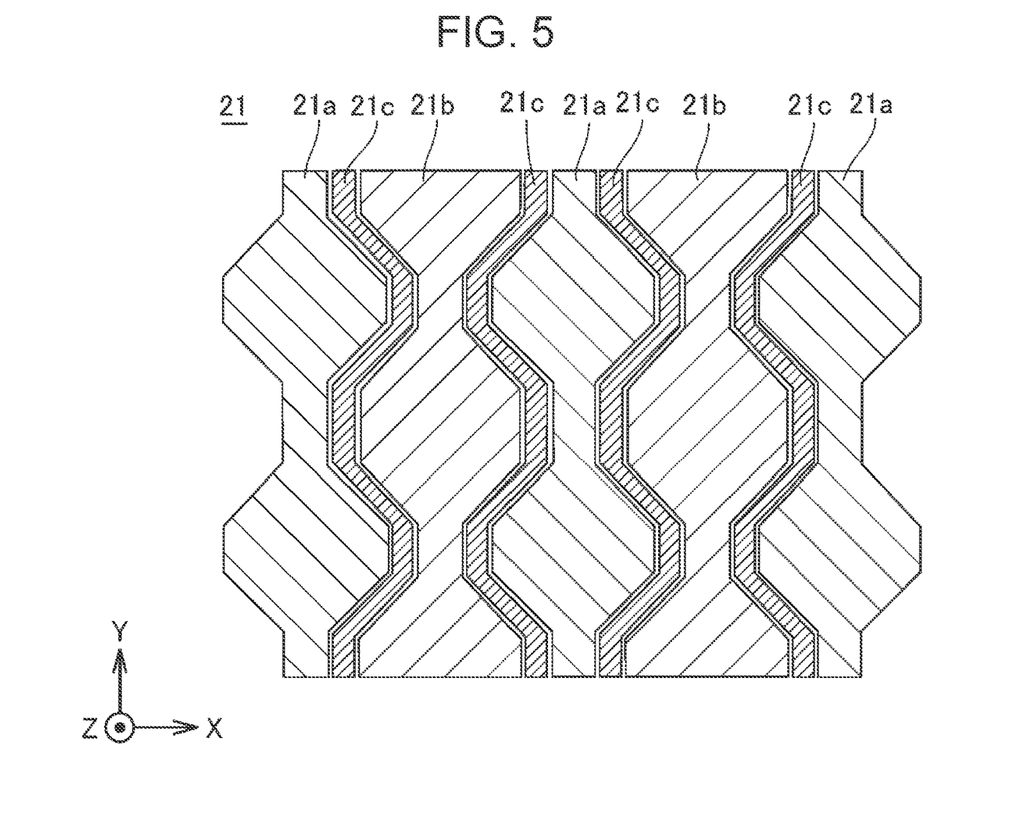
FIG. 5 is a plan view of part of a reception electrode layer.

FIG. 4 is a plan view of part of the transmission electrode layer 11. FIG. 5 is a plan view of part of the reception electrode layer 21. As illustrated in FIG. 4, the transmission electrodes 11a are arranged in a form (substantially diamond pattern) in which a plurality of substantially rhombic electrodes are linked in a diagonal line direction (X direction). The floating electrodes 11b are made up of a plurality of substantially rhombic electrodes that are not linked. Also, as illustrated in FIG. 5, the position detection electrodes 21a are arranged in a substantially diamond pattern in which a plurality of substantially rhombic electrodes are linked in a diagonal line direction (Y direction). Also, the pressing force detection electrodes 21b are arranged in a substantially diamond pattern in which a plurality of substantially rhombic electrodes are linked in a diagonal line direction (Y direction). The position detection electrodes 21a and the pressing force detection electrodes 21b are disposed alternatingly in a direction (X direction) perpendicular to the linking direction of the substantially rhombic electrodes. Also, the shield electrodes 21c may be disposed between the position detection electrodes 21a and the pressing force detection electrodes 21b in plan view.

Also, as illustrated in FIGS. 2 and 3, the transmission electrodes 11a cover at least part of the pressing force detection electrodes 21b. The floating electrodes 11b cover at least part of the position detection electrodes 21a in plan view. Also, at least part of the transmission electrodes 11a covers part of the shield electrodes 21c.

Figure 6:
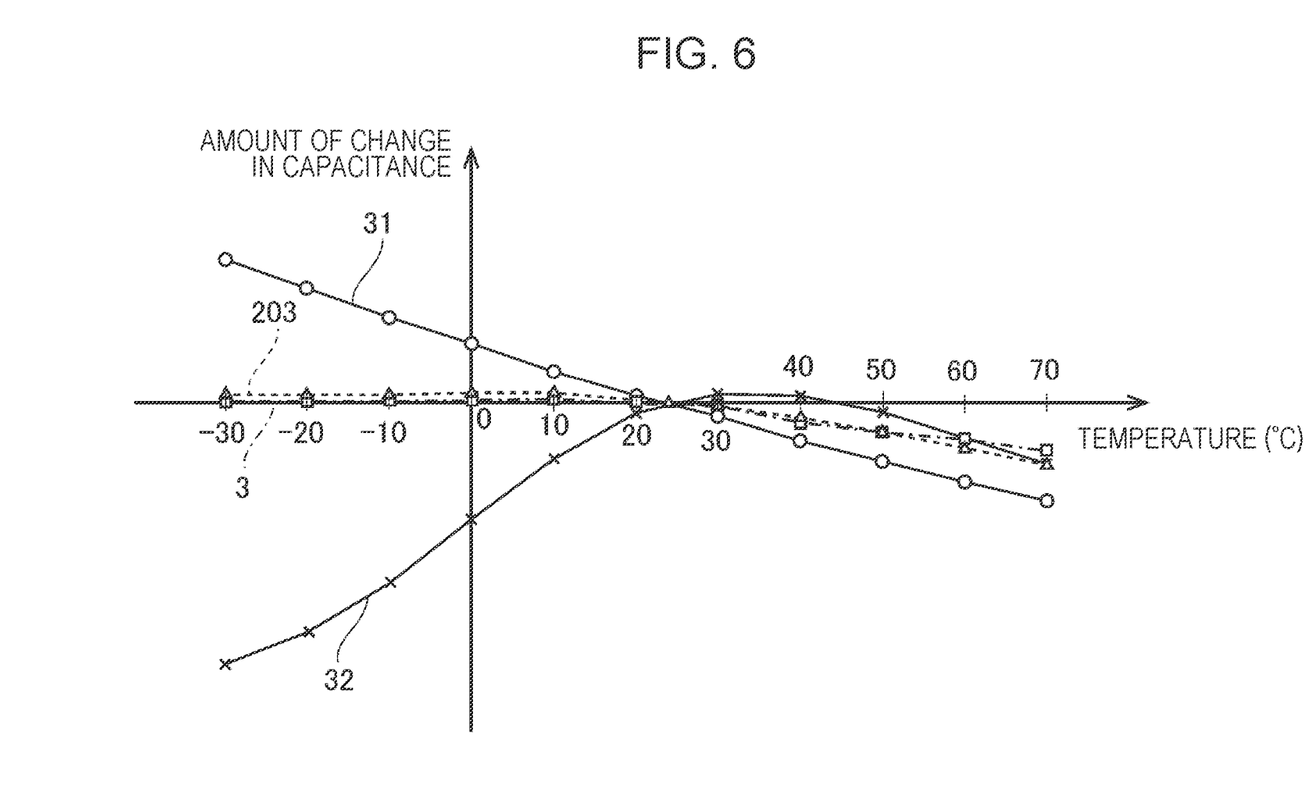
FIG. 6 is a diagram for describing temperature dependency of amount of change in capacitance at a pressure-sensitive layer according to the first embodiment and a pressure-sensitive layer according to a modification of the first embodiment.

Note that, as illustrated in FIG. 3, the pressure-sensitive layer 3 includes a first dielectric layer 31 and a second dielectric layer 32 in the first embodiment. FIG. 6 is a diagram for describing temperature dependency of amount of change in capacitance at the pressure-sensitive layer 3 according to the first embodiment. Also, FIG. 6 shows measurement results of amounts of change in capacitance of the first dielectric layer 31, the second dielectric layer 32, the pressure-sensitive layer 3, and a pressure-sensitive layer 203, at each temperature, in comparison with the capacitance at about 25 degrees Celsius. In the first embodiment, a dielectric constant of the first dielectric layer 31 exhibits negative temperature properties in a predetermined temperature range. Also, a dielectric constant of the second dielectric layer 32 exhibits positive temperature properties in a predetermined temperature range. Note that the "predetermined temperature range" is a temperature range including a least part of temperatures that the pressure-sensitive layer 3 can assume under an environment in which the touch panel 1 is used. Specifically, the lower the temperature is in comparison with about 25 degrees Celsius, the greater the capacitance of the first dielectric layer 31 becomes, and the higher the temperature is in comparison with about 25 degrees Celsius, the smaller the capacitance thereof becomes. The lower the temperature is in comparison with about 25 degrees Celsius, the smaller the capacitance of the second dielectric layer 32 becomes. Now, capacitance C can be expressed by the following Expression (1)

$$C = \varepsilon \times (S/t) \quad (1)$$

where ε represents a dielectric constant, S represents area, and t represents thickness.

With the area S and the thickness t in the above Expression (1) unchanged, the lower the temperature is in comparison with about 25 degrees Celsius, the greater the capacitance C of the first dielectric layer 31 becomes, and accordingly the dielectric constant ε increases. That is to say, the dielectric constant ε of the first dielectric layer 31 exhibits negative temperature properties at about 25 degrees Celsius or lower at least. Also, in the first embodiment, a silicon-based dielectric material, for example, may be used as the dielectric of the first dielectric layer 31 that exhibits negative temperature properties. As shown in FIG. 6, the dielectric constant of the silicon-based dielectric material exhibits negative temperature properties over a range of at least about −30 degrees Celsius to about 20 degrees Celsius, and exhibits negative temperature properties over a range of about −30 degrees Celsius to about 70 degrees Celsius.

Also, the lower the temperature is in comparison with about 25 degrees Celsius, the smaller the capacitance C of the second dielectric layer 32 becomes, and according to the above Expression (1), the dielectric constant s decreases. That is to say, the dielectric constant s of the second dielectric layer 32 exhibits positive temperature properties at about 25 degrees Celsius or lower at least. An acrylic-based dielectric material may be used as the dielectric of the second dielectric layer 32 that exhibits positive temperature properties. As shown in FIG. 6, the dielectric constant of the acrylic-based dielectric material exhibits positive temperature properties at least over a range of about −30 degrees Celsius to about 20 degrees Celsius, and exhibits positive temperature properties over a range of about −30 degrees Celsius to about 30 degrees Celsius.

As illustrated in FIG. 3, a thickness t1 of the first dielectric layer 31 is a different thickness in comparison with a thickness t2 of the second dielectric layer 32. For example, the thickness t1 may be greater than the thickness t2. Also, the thickness t1 is more than about 1.5 times greater than the thickness t2. For example, the thickness t1 is about 125 μM, and the thickness t2 is about 75 μm. In this case, the amount of change in capacitance of the pressure-sensitive layer 3 is approximately zero (minute) in a temperature range of no less than about −30 degrees Celsius to no more than about 30 degrees Celsius, as shown in FIG. 6. Specifically, at about −30 degrees Celsius, the amount of change in capacitance of the pressure-sensitive layer 3 decreased by an amount equivalent to a range from about 93% to about 97%, with respect to the amount of change in capacitance of the first dielectric layer 31. That is to say, the dielectric constant of the pressure-sensitive layer 3 is approximately unchanged at least in a temperature range of no less than about −30 degrees Celsius to no more than about 30 degrees Celsius. Accordingly, even in a case in which the temperature of the pressure-sensitive layer 3 changes, change in capacitance due to change in dielectric constant of the first dielectric layer 31 included in the pressure-sensitive layer 3 can be cancelled out by change in capacitance due to change in dielectric constant of the second dielectric layer 32 included in the pressure-sensitive layer 3. As a result, erroneously detecting temperature change of the pressure-sensitive layer 3 as touches can be suppressed.

Figure 7:
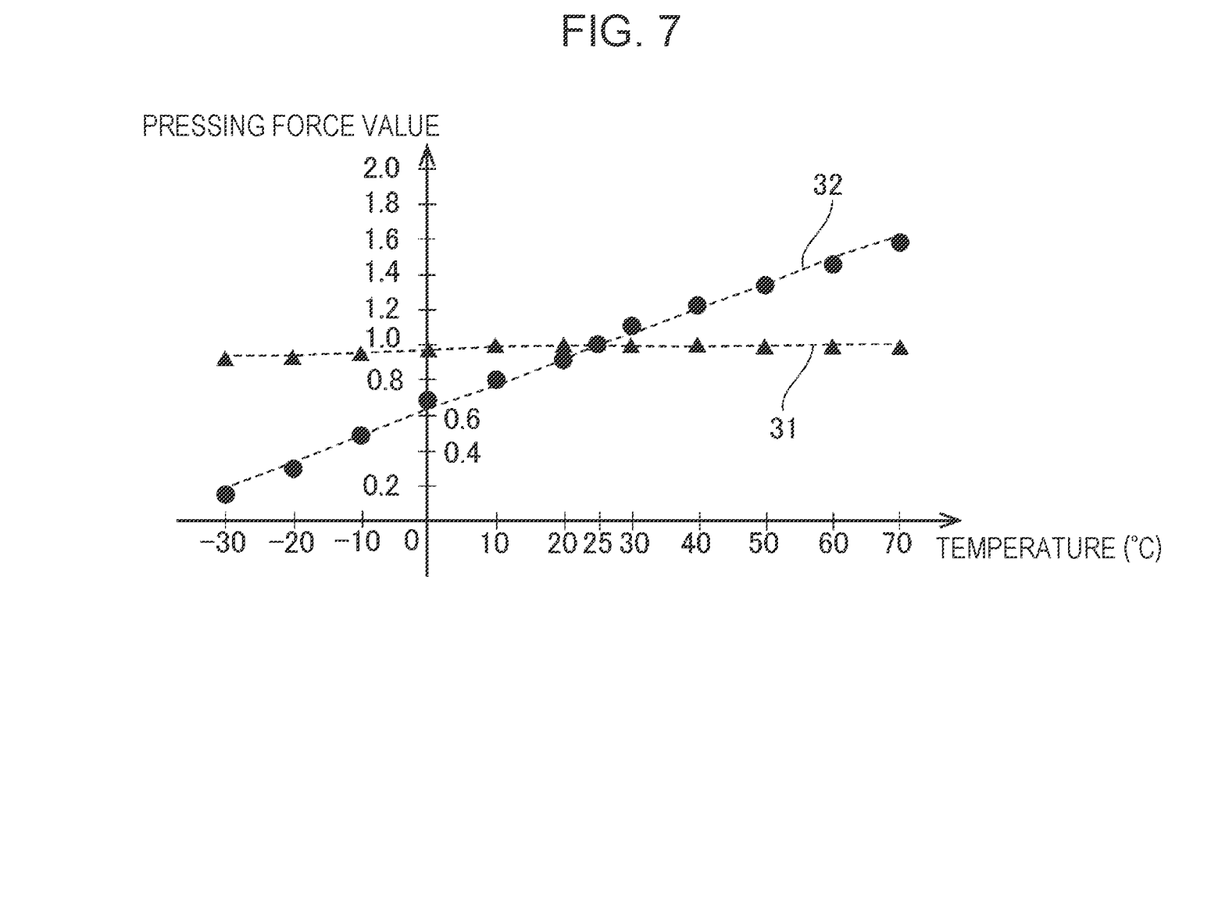
FIG. 7 is a diagram for describing temperature dependency of sensitivity of a first dielectric layer and a second dielectric layer with respect to pressing force.

The first dielectric layer 31 is made of a silicone-based pressure-sensitive material (material having elasticity). Also, the second dielectric layer 32 is made of an acrylic-based pressure-sensitive material (material having elasticity). FIG. 7 is a diagram for describing temperature dependency of sensitivity of the first dielectric layer 31 and the second dielectric layer 32 with respect to pressing force. FIG. 7 shows results of measuring detection values of pressing force (pressing force values) in a case of applying a predetermined load (e.g., about 100 g), for each of the first dielectric layer 31 and the second dielectric layer 32. In FIG. 7, pressing force values at each temperature are shown, with the pressing force value at about 25 degrees Celsius as about 1.0. For example, according to the results in FIG. 7, the pressing force value of the second dielectric layer 32 at about −30 degrees Celsius is about 0.13 times as great as the pressing force value at about 25 degrees Celsius, while the pressing force value of the first dielectric layer 31 at about −30 degrees Celsius is about 0.91 times as great as the pressing force value at about 25 degrees Celsius.

Now, a small pressing force value with respect to a predetermined load means that the pressure-sensitive material is hard (elastic modulus is high), and that the distance between the transmission electrodes 11a and the pressing force detection electrodes 21b is not readily reduced. Also, a great pressing force value with respect to a predetermined load means that the pressure-sensitive material is soft (elastic modulus is low), and that the distance between the transmission electrodes 11a and the pressing force detection electrodes 21b is readily reduced. Temperature dependency of the elastic modulus of the second dielectric layer 32 is great in comparison with that of the first dielectric layer 31. Also, the elastic modulus of the first dielectric layer 31 is small in temperature dependency, and is unchanged with respect to temperature change. That is to say, the amount of change in elastic modulus of the first dielectric layer 31 with respect to predetermined temperature change (change within a range of about −30 degrees Celsius to about 70 degrees Celsius) may be smaller than the amount of change in elastic modulus of the second dielectric layer 32 with respect to the predetermined temperature change (change within a range of about −30 degrees Celsius to about 70 degrees Celsius). Accordingly, in the first embodiment, the first dielectric layer 31 is disposed closer to the first substrate 10 side (the side touched by the instructing member) than the second dielectric layer 32. Accordingly, the first dielectric layer 31 of which the elastic modulus changes less readily under temperature change is disposed on the side that is touched, and accordingly deterioration in sensitivity of the sensor of the touch panel 1 can be suppressed. In the case of the first embodiment, sensitivity of the sensor of the touch panel 1 can be suppressed from deteriorating in a temperature range of no less than about −30 degrees Celsius to no more than about 25 degrees Celsius.

Figure 8:
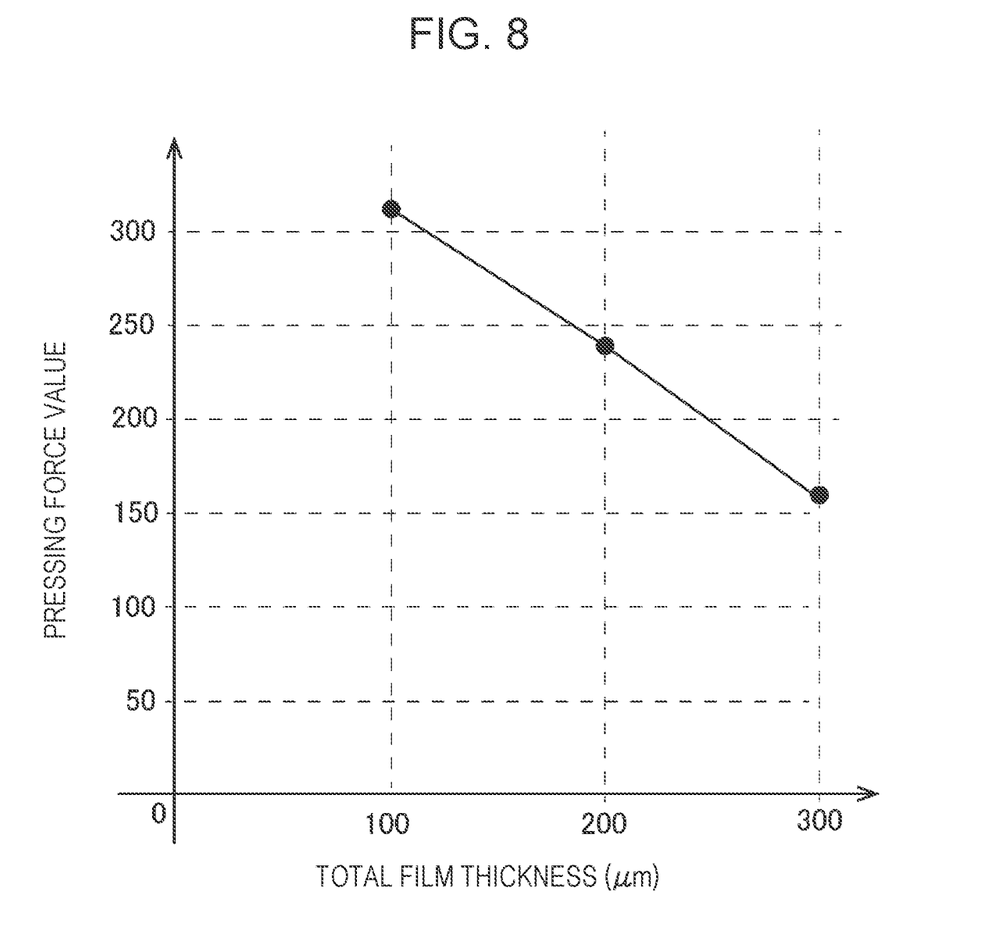
FIG. 8 is a diagram for describing a relation between a pressing force value of the pressure-sensitive layer and total film thickness.

FIG. 8 is a diagram for describing a relation between a pressing force value of a pressure-sensitive layer and total film thickness of the pressure-sensitive layer. FIG. 8 shows results measured for pressing force values under a predetermined load for total film thicknesses of each of about 100

μm, about 200 μm, and about 300 μm, of the pressure-sensitive layer, with the thickness of the cover glass 13 set to about 1.1 mm. As shown in in FIG. 8, the greater the total film thickness is, the lower the pressing force value is. Accordingly, setting the total film thickness of the pressure-sensitive layer to be no more than about 200 μm enables the sensitivity of the touch panel 1 to be improved with respect to pressing force. Now, in the first embodiment, the first dielectric layer 31 and the second dielectric layer 32 may be in contact, and the total film thickness of the pressure-sensitive layer 3 is about 200 μm, which is the total value of the about 125 μm of the first dielectric layer 31 and the about 75 m of the second dielectric layer 32. Also, setting the total film thickness to be smaller than about 50 μm increases the capacitance of the load between the transmission electrodes 11a and the pressing force detection electrodes 21b, and touch detection sensitivity of the touch panel 1 deteriorates. Accordingly, in the first embodiment, the total film thickness of the pressure-sensitive layer 3 is set to be no less than about 50 μm.

Operations of Touch Panel 1

Next, operations of the touch panel 1 will be described with reference to FIG. 3. As illustrated in FIG. 3, the floating electrodes 11b form the capacitance C2 between themselves and the position detection electrodes 21a. When an instructing member F comes into contact with the cover glass 13, capacitive coupling occurs between the instructing member F and each of the transmission electrodes 11a and the floating electrodes 11b. Accordingly, the capacitance (C1 and C2) between the transmission electrodes 11a and the position detection electrodes 21a decreases through the instructing member F and the floating electrodes 11b, and the signals detected at the position detection electrodes 21a change, whereby the position of the instructing member F is detected. Note that at this time, the capacitance C3 between the transmission electrodes 11a and the pressing force detection electrodes 21b hardly changes at all.

Also, as illustrated in FIG. 3, when pressing force is applied to the cover glass 13 by the instructing member F, the pressure-sensitive layer 3 becomes recessed, and the distance between the transmission electrodes 11a and the pressing force detection electrodes 21b is reduced. This increases the capacitance C3 between the transmission electrodes 11a and the pressing force detection electrodes 21b, and the signals detected at the pressing force detection electrodes 21b change. The magnitude of the pressing force (pressing force value) is thus detected in accordance with the change in signals detected at the pressing force detection electrodes 21b. Now, the transmission electrodes 11a are closer to the shield electrodes 21c than to the position detection electrodes 21a, and accordingly, the transmission electrodes 11a form the capacitance C4 between themselves and the shield electrodes 21c, and not the position detection electrodes 21a. As a result, increase in capacitance between the transmission electrodes 11a and the position detection electrodes 21a is suppressed, and accordingly effects from detection of the touch position by the pressing force can be suppressed. Thus, the touch position can be detected with good precision when pressing force is applied to the transmission electrodes 11a by the instructing member F.

Manufacturing Method of Touch Panel 1

Figure 9:
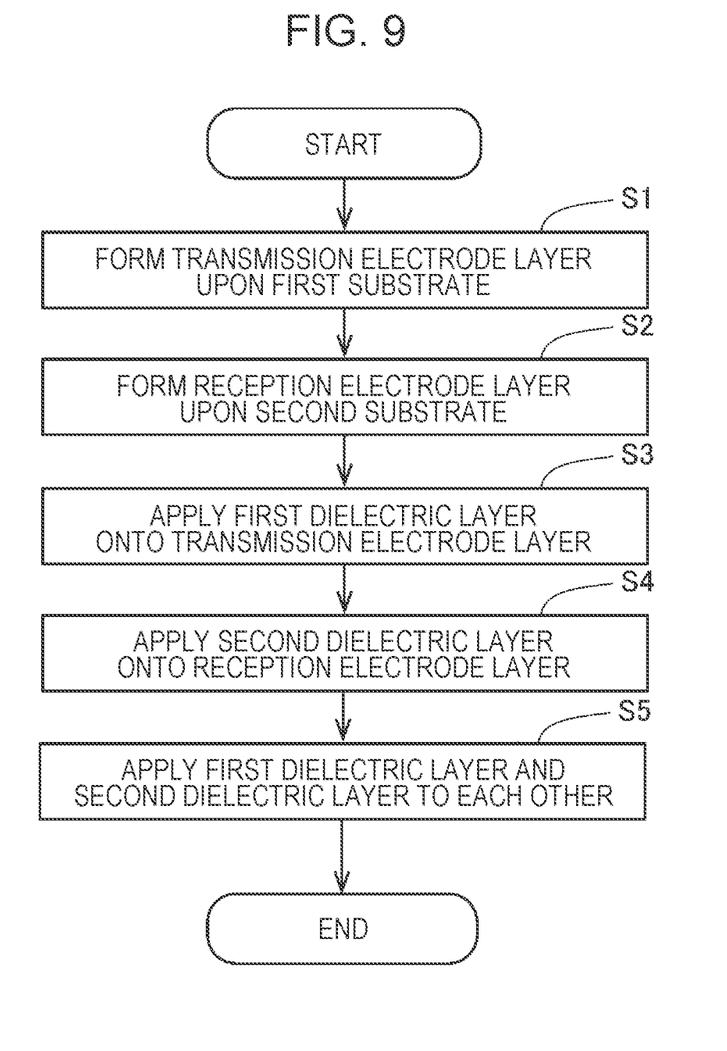
FIG. 9 is a flowchart showing manufacturing processes of the touch panel according to the first embodiment.
Figure 10:
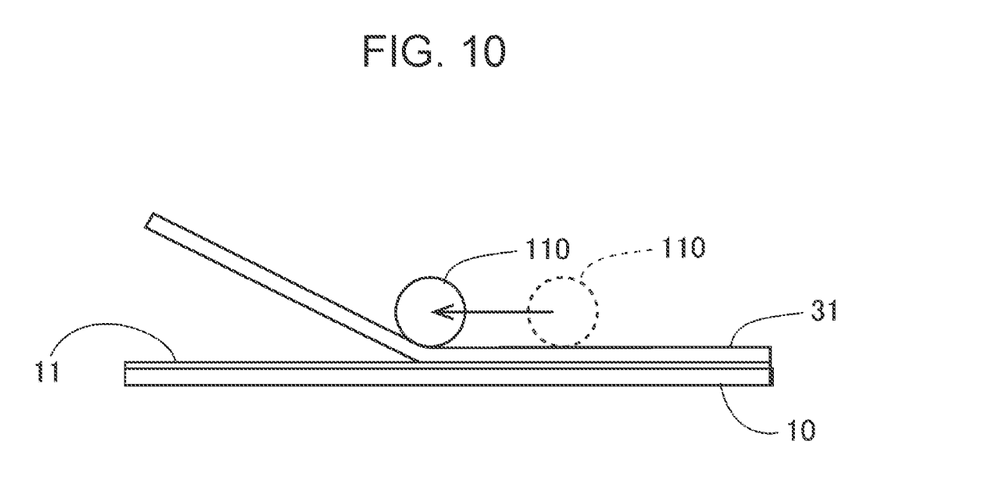
FIG. 10 is a diagram for describing a process of applying the first dielectric layer onto the transmission electrode layer.

Next, a manufacturing method of the touch panel 1 according to the first embodiment will be described with reference to FIGS. 9 and 10. FIG. 9 is a flowchart illustrating manufacturing processes of the touch panel 1 according to the first embodiment. FIG. 10 is a diagram for describing a process of applying the first dielectric layer 31 onto the transmission electrode layer 11.

As illustrated in FIG. 9, the transmission electrode layer 11 is formed upon the first substrate 10 in step S1. For example, the transmission electrodes 11a and the floating electrodes 11b are formed in the same layer, by formation of an electroconductive thin film such as ITO or the like, upon the first substrate 10. Also, the reception electrode layer 21 is formed upon the second substrate 20 in step S2. For example, the position detection electrodes 21a, the pressing force detection electrodes 21b, and the shield electrodes 21c are formed in the same layer, by formation of an electroconductive thin film such as ITO or the like, upon the second substrate 20. Note that step S1 may be carried out after step S2.

Following steps S1 and S2, the first dielectric layer 31 is applied onto the transmission electrode layer 11 in step S3. For example, the first dielectric layer 31 is applied onto the transmission electrode layer 11 by the first dielectric layer 31 being pressed by a roller member 110 onto the transmission electrode layer 11 and the first substrate 10, as illustrated in FIG. 10. Also, in step S4, the second dielectric layer 32 is applied onto the reception electrode layer 21. Note that the roller member 110 illustrated in FIG. 10 may be used for applying the second dielectric layer 32 onto the reception electrode layer 21. Also note that step S3 may be carried out after step S4.

Following steps S3 and 34, the first dielectric layer 31 and the second dielectric layer 32 are applied to each other in step S5. Note that the roller member 110 illustrated in FIG. 10 may be used for applying the first dielectric layer 31 and the second dielectric layer 32 to each other. Thereafter, the cover glass 13 is disposed on the first substrate 10 across the OCA layer 12, thus completing the touch panel 1. Note that disposing the display unit 2 on the second substrate 20 across the OCA layer 22 completes the display device 100.

Modification of First Embodiment

Figure 11:
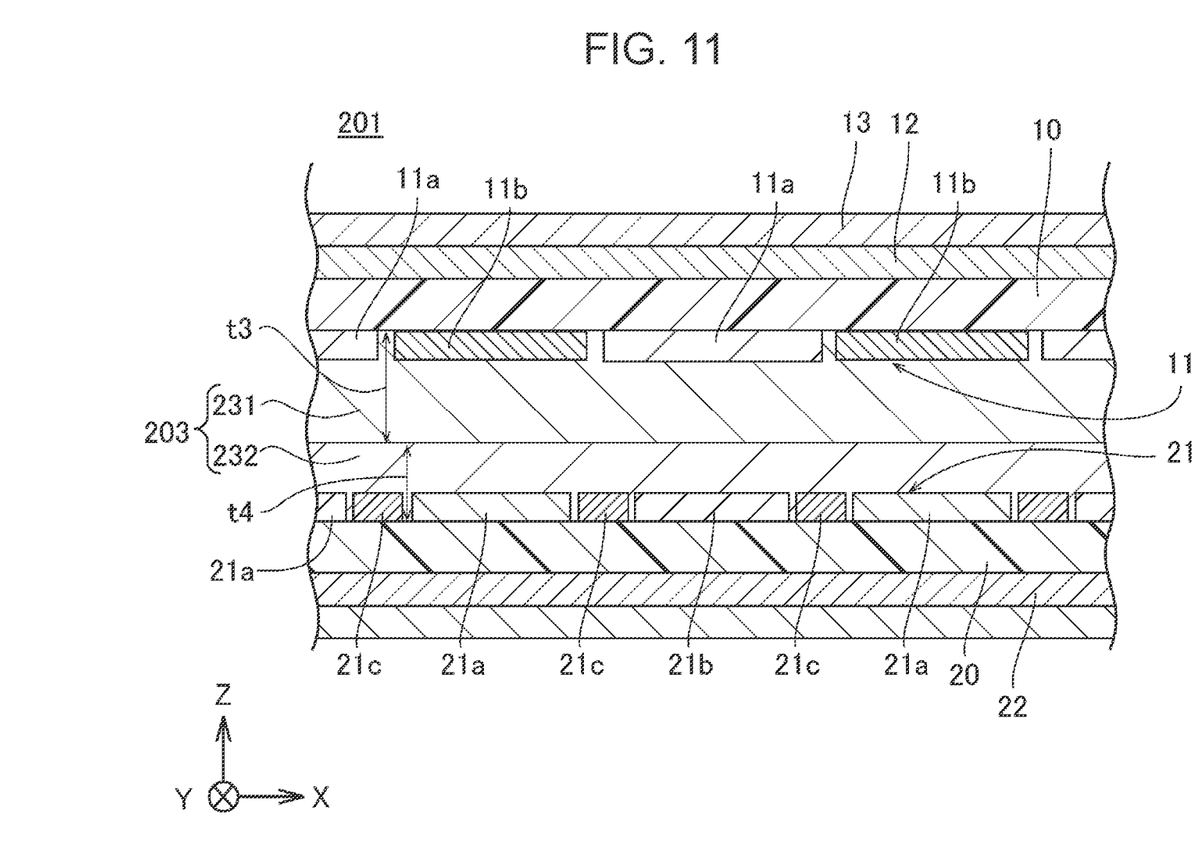
FIG. 11 is a sectional view of part of a touch panel according to a modification of the first embodiment.

Next, a configuration of a touch panel 201 according to a modification of the first embodiment will be described with reference to FIGS. 6 and 11. Note that configurations that are the same as in the first embodiment are denoted by the same symbols, and description will be omitted. FIG. 11 is a sectional view of part of the touch panel 201 according to the modification of the first embodiment.

As illustrated in FIG. 11, the touch panel 201 includes the pressure-sensitive layer 203. The pressure-sensitive layer 203 includes a first dielectric layer 231 and a second dielectric layer 232. The first dielectric layer 231 is made of the same material as the first dielectric layer 31. Also, the second dielectric layer 232 is made of the same material as the second dielectric layer 32. A thickness t3 of the first dielectric layer 231 is greater than a thickness t4 of the second dielectric layers 232. Also, the thickness t3 is about 85 μm. The thickness t4 is about 50 μm. That is to say, the total film thickness of the pressure-sensitive layer 203 is about 135 μm.

As shown in FIG. 6, in the pressure-sensitive layer 203 of the touch panel 201 according to the modification of the first embodiment as well, change in capacitance due to change in dielectric constant of the first dielectric layer 231 included in the pressure-sensitive layer 203 can be cancelled out by change in capacitance due to change in dielectric constant of the second dielectric layer 232 included in the pressure-sensitive layer 203.

Second Embodiment

Figure 12:
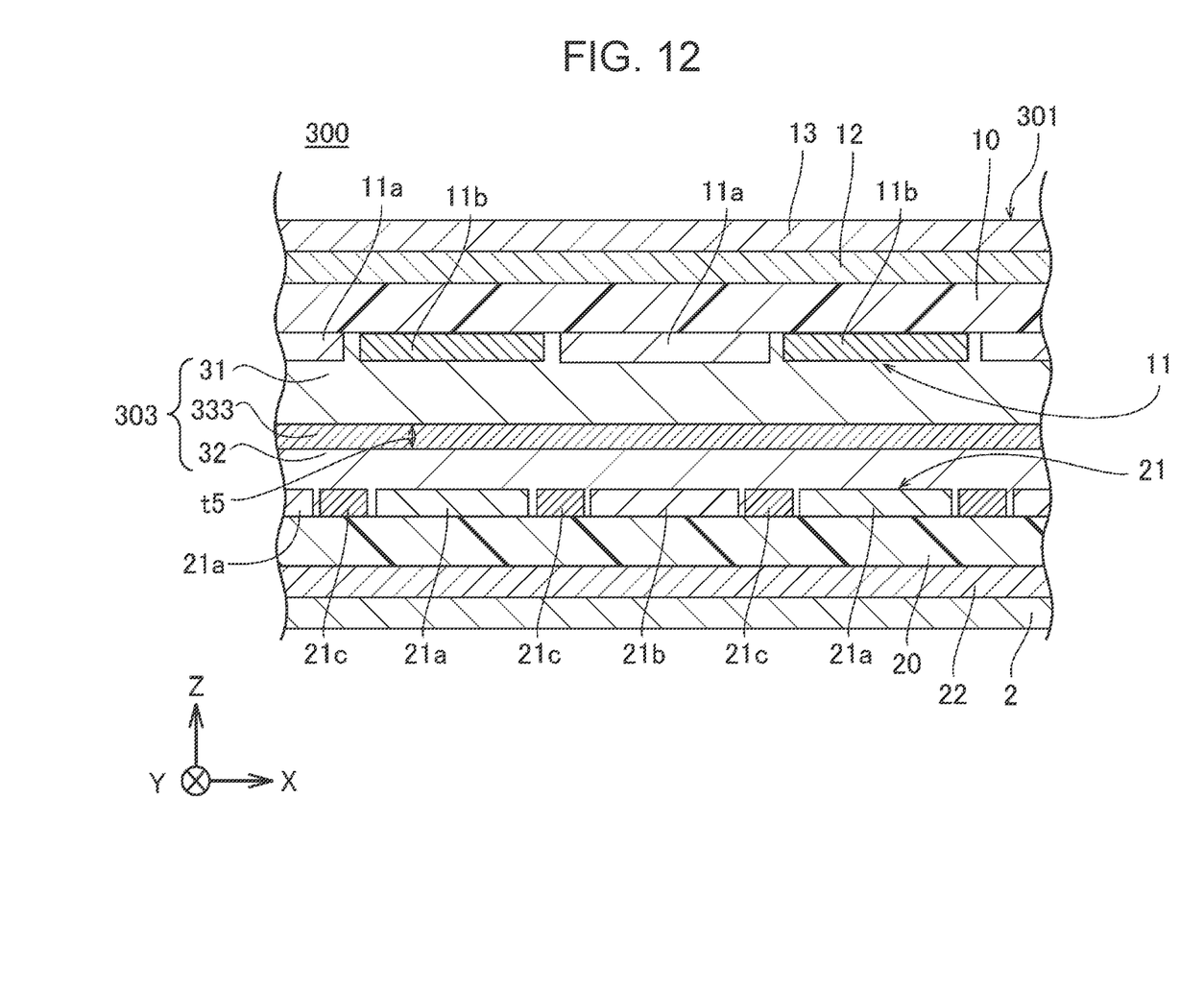
FIG. 12 is a sectional view illustrating a configuration of a display device according to a second embodiment.

Next, a configuration of a display device 300 according to a second embodiment will be described with reference to FIG. 12. FIG. 12 is a sectional view illustrating the configuration of the display device 300 according to the second embodiment. Note that configurations that are the same as in the first embodiment are denoted by the same symbols as in the first embodiment, and description will be omitted.

As illustrated in FIG. 12, the display device 300 includes a touch panel 301. The touch panel 301 includes a pressure-sensitive layer 303. The pressure-sensitive layer 303 includes the first dielectric layer 31 and the second dielectric layer 32, and a film member 333. The film member 333 may be made of a material that each of the first dielectric layer 31 and the second dielectric layer 32 adhere to. Also, the film member 333 is made of a transparent material. For example, the film member 333 may be made of a polyester-based material (e.g., polyethylene terephthalate (PET)), or may be made of a cycloolefin polymer (COP). Also, a thickness t5 of the film member 333 is smaller than the thickness t1 of the first dielectric layer 31 and also is smaller than the thickness t2 of the second dielectric layer 32, although not limited to this. According to this configuration, even in a case in which the first dielectric layer 31 and the second dielectric layer 32 do not readily adhere to each other directly, adhering each of the first dielectric layer 31 and the second dielectric layer 32 to the respective sides of the film member 333 enables the pressure-sensitive layer 303, in which the first dielectric layer 31 and the second dielectric layer 32 are overlaid, to be easily configured. Other configurations and effects are the same as those of the first embodiment.

Manufacturing Method of Touch Panel 301

Figure 13:
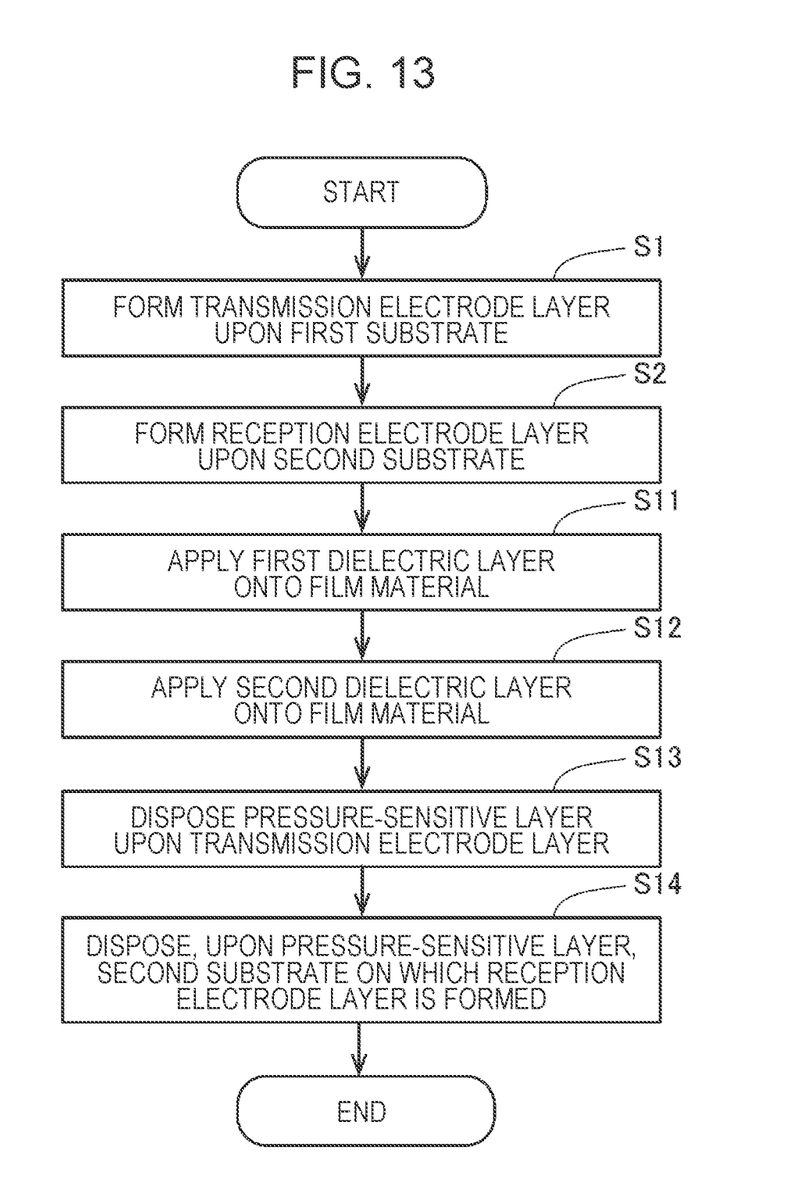
FIG. 13 is a flowchart showing manufacturing processes of a touch panel according to the second embodiment.

Next, a manufacturing method of the touch panel 301 according to the second embodiment will be described with reference to FIG. 13. FIG. 13 is a flowchart showing manufacturing processes of the touch panel 301 according to the second embodiment. Note that processes that are the same as the manufacturing processes in the first embodiment are denoted by the same step numbers, and description will be omitted.

As shown in FIG. 13, the first dielectric layer 31 is applied onto the surface of the film member 333 in step S11. Also, in step S12, the second dielectric layer 32 is applied onto the face of the film member 333 that is on the opposite side from the face on which the first dielectric layer 31 is applied. Thus, the pressure-sensitive layer 303 is completed. Note that the roller member 110 illustrated in FIG. 10 may be used when applying the first dielectric layer 31 and the second dielectric layer 32 to the film member 333. Also, step S11 may be performed after step S12.

Also, in step S13, the pressure-sensitive layer 303 is disposed on the transmission electrode layer 11. Then in step 314, the second substrate 20 on which the reception electrode layer 21 is formed is disposed upon the pressure-sensitive layer 303. Thereafter, the cover glass 13 is disposed on the first substrate 10 across the OCA layer 12, thereby completing the touch panel 301. Note that the display device 300 is completed by the display unit 2 being disposed on the second substrate 20 across the OCA layer 22.

Although embodiments are described above, the above-described embodiments are only exemplifications of carrying out the present disclosure. Accordingly, the present disclosure is not limited to the above-described embodiments, and the above-described embodiments can be carried out with appropriate modifications without departing from the spirit of the present disclosure.

(1) Although an example is described in the first and second embodiments in which the touch panel is configured to be able to detect both touch position and magnitude of pressing force, the present disclosure is not limited to this. That is to say, the touch panel may be configured such that only one of touch position and magnitude of pressing force is detectable.

(2) Although an example is described in the first and second embodiments in which two dielectric layers are provided in the pressure-sensitive layer, the present disclosure is not limited to this. That is to say, three or more dielectric layers may be provided in the pressure-sensitive layer.

(3) Although an example is described in the first and second embodiments in which the first dielectric layer is made of a silicon-based material, and the second dielectric layer is made of an acrylic-based material, the present disclosure is not limited to this. For example, a fluororesin material or an olefin-based material (olefin-based adhesive) may be used for the first dielectric layer. Also, a polybutylene terephthalate (PBT)-based material may be used for the second dielectric layer.

(4) Although an example is described in the first and second embodiments in which the first dielectric layer is disposed closer to the cover glass side than the second dielectric layer, the present disclosure is not limited to this. That is to say, the second dielectric layer may be disposed closer to the cover glass side than the first dielectric layer.

(5) Although an example is described in the first and second embodiments in which the transmission electrodes, the floating electrodes, the position detection electrodes, and the pressing force detection electrodes are formed as substantially rhombic shapes, the present disclosure is not limited to this. For example, the transmission electrodes, the floating electrodes, the position detection electrodes, and the pressing force detection electrodes may be formed as rectangular, circular, or polygonal shapes.

(6) Although an example is described in the first and second embodiments in which the floating electrodes are provided to the transmission electrode layer and the shield electrodes are provided to the reception electrode layer, the present disclosure is not limited to this. For example, the floating electrodes do not have to be provided to the transmission electrode layer, and the shield electrodes do not have to be provided to the reception electrode layer.

(7) Although an example is described in the first and second embodiments in which the potential of the shield electrodes is the ground potential, the present disclosure is not limited to this. For example, the potential of the shield electrodes may be equal to the potential of the position detection electrodes or to the potential of the pressing force detection electrodes.

Figure 14:
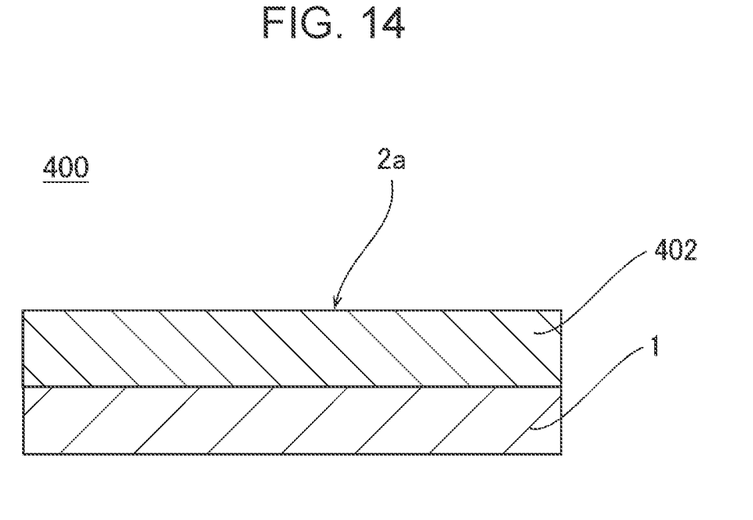
FIG. 14 is a sectional view illustrating a schematic configuration of a display device according to a modification of the first and second embodiments.

(8) Although an example is described in the first and second embodiments in which the touch panel is disposed on the display face side (on the display) of the display unit as illustrated in FIG. 1, the present disclosure is not limited to this. For example, the touch panel 1 may be disposed on the opposite side of a display unit 402 from the display face thereof, as in a display device 400 according to a modification of the first and second embodiments illustrated in FIG. 14.

The above-described capacitive touch panel and display device can also be described as follows.

A capacitive touch panel according to a first configuration includes a transmission electrode layer that includes a transmission electrode to which a drive signal is supplied, a reception electrode layer that includes a plurality of reception electrodes that form capacitance between the transmission electrode layer and the reception electrodes, in accordance with the capacitance, at least one of touching and pressing force is detected, and a dielectric film interposed between the transmission electrode layer and the reception electrode layer. The dielectric film includes a first dielectric layer of which dielectric constant exhibits negative temperature properties, and a second dielectric layer of which dielectric constant exhibits positive temperature properties (first configuration).

According to the first configuration, even in a case in which the temperature of the dielectric film changes, change in capacitance due to change in dielectric constant of the first dielectric layer included in the dielectric film can be cancelled out by change in capacitance due to change in dielectric constant of the second dielectric layer included in the dielectric film. As a result, erroneously detecting temperature change of the dielectric film as touches can be suppressed.

In the first configuration, an amount of change in dielectric constant of the first dielectric layer with respect to a predetermined temperature change may be smaller than an amount of change in dielectric constant of the second dielectric layer with respect to the predetermined temperature change, and a thickness of the first dielectric layer may be greater than a thickness of the second dielectric layer (second configuration).

According to the second configuration, even in a case in which the amount of change in dielectric constant of the first dielectric layer is smaller than the amount of change in dielectric constant of the second dielectric layer, the difference in the amount of change in capacitance by the first dielectric layer and the amount of change in capacitance by the second dielectric layer can be reduced by the thickness of the first dielectric layer being greater than the thickness of the second dielectric layer.

In the first or second configuration, an amount of change in elastic modulus of the first dielectric layer with respect to the predetermined temperature change may be smaller than an amount of change in elastic modulus of the second dielectric layer with respect to the predetermined temperature change, and the first dielectric layer may be disposed closer to a side touched by an instructing member than the second dielectric layer (third configuration).

Now, it is known that sensitivity of a sensor is high when the elastic modulus of the dielectric layer is low (soft), and is low when the elastic modulus of the dielectric layer is high (hard). Thus, according to the third configuration, the first dielectric layer that less readily exhibits change in elastic modulus due to temperature change is disposed on the side that is touched, and thereby deterioration in sensitivity of the sensor can be suppressed.

In any one of the first to third configurations, the first dielectric layer may include a silicon-based pressure-sensitive material, and the second dielectric layer may include an acrylic-based pressure-sensitive material (fourth configuration).

According to the fourth configuration, the dielectric constant of silicon-based dielectric material exhibits negative temperature properties and the dielectric constant of acrylic-based dielectric material exhibits positive temperature properties, and accordingly the first dielectric layer can be configured so as to exhibit a dielectric constant with negative temperature properties, and the second dielectric layer can be configured so as to exhibit a dielectric constant with positive temperature properties.

In any one of the first to fourth configurations, the reception electrode layer may include a position detection electrode and a pressing force detection electrode (fifth configuration).

According to the fifth configuration, a capacitive touch panel can be provided that is capable of detecting both touch position and pressing force.

In the fifth configuration, the reception electrode layer may further include a shield electrode that is disposed between the position detection electrode and the pressing force detection electrode in plan view (sixth configuration). Further, in the sixth configuration, potential of the shield electrode may be a ground potential, or equal to potential of the position detection electrode or to potential of the pressing force detection electrode (seventh configuration).

Now, in a case of the reception electrode layer including a position detection electrode and a pressing force detection electrode, when the instructing member presses the transmission electrode layer toward the reception electrode layer, the transmission electrode comes closer to the pressing force detection electrode, and the transmission electrode also comes closer to the position detection electrode. In this case, the capacitance between the transmission electrode and the position detection electrode changes, and as a result, the touch position is not precisely detectable when the transmission electrode is pressed by the instructing member. Conversely, according to the sixth and seventh configurations, capacitance is formed by the shield electrode between the transmission electrode and the shield electrode, and thus change in capacitance between the transmission electrode and the position detection electrode can be suppressed. Accordingly, the touch position can be detected with good precision when the transmission electrode is pressed by the instructing member.

In any one of the fifth to seventh configurations, the transmission electrode layer may further include a floating electrode of which potential is in a floating state, and the floating electrode is disposed at a position that overlaps the position detection electrode in plan view (eighth configuration).

According to the eighth configuration, even when the transmission electrode is pressed toward the pressing force detection electrode by the instructing member, capacitance is formed between the position detection electrode and the floating electrode, and accordingly change in capacitance between the transmission electrode and the position detection electrode can be reduced. Thus, the touch position can be detected with good precision when the transmission electrode is pressed by the instructing member.

In any one of the first to eighth configurations, the first dielectric layer and the second dielectric layer may be in contact (ninth configuration).

According to the ninth configuration, the number of types of parts can be reduced in comparison with a case of providing another member between the first dielectric layer and the second dielectric layer.

In any one of the first to eighth configurations, the dielectric film may further include a film member that is interposed between the first dielectric layer and the second dielectric layer, and to which the first dielectric layer and the second dielectric layer adhere (tenth configuration).

According to the tenth configuration, even in a case in which the first dielectric layer and the second dielectric layer do not readily adhere to each other directly, adhering each of the first dielectric layer and the second dielectric layer to the respective sides of the film member enables the dielectric film, in which the first dielectric layer and the second dielectric layer are overlaid, to be easily configured.

In any one of the first to tenth configurations, the predetermined temperature range may be a temperature range of no less than about −30 degrees Celsius and no more than about 20 degrees Celsius (eleventh configuration).

Now, a fingertip generally has a temperature higher than about 20 degrees Celsius, and accordingly in a case in which the temperature of the dielectric film is in a temperature range of no less than about −30 degrees Celsius and no more than about 20 degrees Celsius, and the fingertip comes into contact with the capacitive touch panel, the temperature of the dielectric film changes. Conversely, according to the eleventh configuration, even in a case in which the temperature of the dielectric film changes in a temperature range of no less than about −30 degrees Celsius and no more than about 20 degrees Celsius, change in capacitance due to change in dielectric constant of the first dielectric layer included in the dielectric film can be cancelled out by change in capacitance due to change in dielectric constant of the second dielectric layer included in the dielectric film.

A display device according to a twelfth configuration includes the capacitive touch panel according to any one of the first through eleventh configurations, and a display that displays an image (twelfth configuration).

According to the twelfth configuration, a display device capable of suppressing erroneous detection of temperature change in the dielectric film as touches can be provided.

The present disclosure contains subject matter related to that disclosed in Japanese Priority Patent Application JP 2021-146941 filed in the Japan Patent Office on Sep. 9, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A capacitive touch panel, comprising:
   a transmission electrode layer that includes a transmission electrode to which a drive signal is supplied;
   a reception electrode layer that includes a plurality of reception electrodes that form capacitance between the transmission electrode layer and the plurality of reception electrodes, in accordance with the capacitance, at least one of touching and pressing force is detected; and
   a dielectric film interposed between the transmission electrode layer and the reception electrode layer, wherein the dielectric film includes
   a first dielectric layer of which dielectric constant exhibits negative temperature properties in a predetermined temperature range, and
   a second dielectric layer of which dielectric constant exhibits positive temperature properties in the predetermined temperature range.

2. The capacitive touch panel according to claim 1, wherein
   an amount of change in dielectric constant of the first dielectric layer in the predetermined temperature range is smaller than an amount of change in dielectric constant of the second dielectric layer in the predetermined temperature range, and
   a thickness of the first dielectric layer is greater than a thickness of the second dielectric layer.

3. The capacitive touch panel according to claim 1, wherein
   an amount of change in elastic modulus of the first dielectric layer in the predetermined temperature range is smaller than an amount of change in elastic modulus of the second dielectric layer in the predetermined temperature range, and
   the first dielectric layer is disposed closer to a side touched by an instructing member than the second dielectric layer.

4. The capacitive touch panel according to claim 1, wherein
   the first dielectric layer includes a silicon-based dielectric material, and
   the second dielectric layer includes an acrylic-based dielectric material.

5. The capacitive touch panel according to claim 1, wherein the reception electrode layer includes a position detection electrode and a pressing force detection electrode.

6. The capacitive touch panel according to claim 5, wherein the reception electrode layer further includes a shield electrode that is disposed between the position detection electrode and the pressing force detection electrode in plan view.

7. The capacitive touch panel according to claim 6, wherein potential of the shield electrode is a ground potential, or equal to potential of the position detection electrode or equal to potential of the pressing force detection electrode.

8. The capacitive touch panel according to claim 5, wherein the transmission electrode layer further includes a floating electrode of which potential is in a floating state, and the floating electrode is disposed at a position that overlaps the position detection electrode in plan view.

9. The capacitive touch panel according to claim 1, wherein the first dielectric layer and the second dielectric layer are in contact.

10. The capacitive touch panel according to claim 1, wherein the dielectric film further includes a film member that is interposed between the first dielectric layer and the second dielectric layer, and to which the first dielectric layer and the second dielectric layer adhere.

11. The capacitive touch panel according to claim 1, wherein the predetermined temperature range is a temperature range of no less than −30 degrees Celsius and no more than 20 degrees Celsius.

12. A display device, comprising:
   the capacitive touch panel according to claim 1; and
   a display that displays an image.

* * * * *